United States Patent
Dirsch et al.

(10) Patent No.: US 7,005,826 B2
(45) Date of Patent: Feb. 28, 2006

(54) METHOD FOR ENHANCING THE CONTROL RESPONSE OF A DRIVE TRAIN HAVING BACKLASH AND/OR ELASTICITY OF A MACHINE TOOL OR PRODUCTION MACHINE

(75) Inventors: Bernhard Dirsch, Erlangen (DE); Hans-Peter Tröndle, Forchheim (DE)

(73) Assignee: Siemens Aktiengesellschaft, München (DE)

( * ) Notice: Subject to any disclaimer, the term of this patent is extended or adjusted under 35 U.S.C. 154(b) by 73 days.

(21) Appl. No.: 10/763,765

(22) Filed: Jan. 22, 2004

(65) Prior Publication Data

US 2004/0150360 A1 Aug. 5, 2004

(30) Foreign Application Priority Data

Jan. 22, 2003 (DE) .............................. 103 02 374

(51) Int. Cl.
*H02P 3/18* (2006.01)

(52) U.S. Cl. .................. 318/727; 318/432; 318/434; 318/632

(58) Field of Classification Search ................ 318/727, 318/432–434, 610, 311, 632
See application file for complete search history.

(56) References Cited

U.S. PATENT DOCUMENTS

| | | | | |
|---|---|---|---|---|
| 4,512,116 A | * | 4/1985 | Vanderwal, Jr. et al. | .... 451/479 |
| 4,608,527 A | * | 8/1986 | Glennon et al. | ............. 318/685 |
| 4,638,898 A | * | 1/1987 | Braun | .......................... 477/86 |
| 5,525,877 A | * | 6/1996 | Umida | ........................ 318/432 |
| 6,414,455 B1 | * | 7/2002 | Watson | ........................ 318/432 |
| 6,566,837 B1 | * | 5/2003 | Zhang et al. | ................ 318/610 |
| 6,598,699 B1 | * | 7/2003 | Takehara et al. | ............. 180/446 |

FOREIGN PATENT DOCUMENTS

DE  43 33 146 A1  3/1994

OTHER PUBLICATIONS

NC/CNC Handbook 95/96, by Hans B. Kief, published by Carl Hanser Verlag Munich Vienna, 1995, pp. 189, FiG. 1a.

* cited by examiner

*Primary Examiner*—Rina Duda
(74) *Attorney, Agent, or Firm*—Henry M. Feiereisen

(57) ABSTRACT

A method for increasing the control response of a drive train of a machine tool or production machine with backlash and/or elasticity is described. A combined signal comprised of the motor speed measured on the motor and the load speed measured near the load of the drive train is supplied to a controller. The combined signal can generated in one of two ways: (1) by weighting the measured motor speed with a first multiplication factor ($\alpha$), by weighting the measured load speed with a second multiplication factor ($1-\alpha$), and by subsequently adding the weighted motor speed to the weighted load speed; or (2) by first subtracting the measured load speed from the measured motor speed, then weighting the resulting difference by a multiplication factor $\alpha$, and finally adding the load speed to the weighted difference.

6 Claims, 2 Drawing Sheets

METHOD FOR ENHANCING THE CONTROL RESPONSE OF A DRIVE TRAIN HAVING BACKLASH AND/OR ELASTICITY OF A MACHINE TOOL OR PRODUCTION MACHINE

CROSS-REFERENCES TO RELATED APPLICATIONS

This application claims the priority of German Patent Application, Ser. No. 103 02 374.7, filed Jan. 22, 2003, pursuant to 35 U.S.C. 119(a)–(d), the disclosure of which is incorporated herein by reference.

BACKGROUND OF THE INVENTION

The present invention relates to a method for enhancing the control response of a drive train with backlash and/or elasticity, and more particular a drive train of this type employed in a machine tool and production machine. In the application, the term "production machine" is used here in a generic sense and includes also robots which generally follow the concepts outlined here.

Machine tools and production machines, including robots, frequently include gears and/or couplings inserted between a drive motor and the driven load. The gears and couplings typically have play, which produce an elastic behavior or backlash between the drive and the load. Backlash has the undesirable effect on a control system that the force that must be produced by the motor is almost zero up to a certain point or displacement distance, and that from that point on the motion can only be sustained by applying a significantly greater force than the initial force.

Backlash is produced, for example in gears employing toothed wheels, wherein a tooth of a first gear wheel is located exactly between two teeth of a second gear wheel. When the drive motor connected to, for example, the first gear wheel starts up, only a very small force is required for moving the first gear wheel. However, when a corresponding tooth of the first gear wheel contacts a tooth of the second gear wheel connected with load, the motor requires a significantly greater force for continuing the travel motion.

The mechanical components used in gears and couplings also have elasticity, which do not permit a direct proportional relationship between motor speed and the speed of the load, in particular for a dynamic motion.

Accordingly, backlash and/or elasticity necessitate a nonlinear characteristic of the controlled system.

In conventional applications, the controlled valuable supplied to a speed controller that controls the motor speed is either an actual motor speed that is measured directly on the motor or a load speed that is measured proximate to the load. Both methods have certain disadvantages. Due to the aforementioned backlash and/or elasticity, the motor speed is not identical to the load speed, in particular in dynamic processes.

If the motor speed is used as the only controlled valuable, then the control amplification of the controller can disadvantageously not be set to reflect the entire mass of the controlled system, which is composed of the mass of the load, the mass of the motor and the mass of the gears, because the aforementioned individual masses cannot be viewed as a single rigid total mass due to the existing backlash and/or elasticity. Since the control amplification of the controller is typically set to optimize the damping behavior of the system, the control amplification must be kept low, which adversely affects the control response.

If the load speed is used as the only controlled variable, then the control circuit tends to exhibit instabilities, because the electromechanical components have a rather small mechanical damping during torque reversal and the backlash and/or elasticity also contribute a small torque. In this case, the control amplification of the controller can be adapted to the load, which permits high control amplification with an excellent control response. A system control based on controlling the load speed, however, can only be implemented when the mechanical components of the drive system are very stiff. Accordingly, such control methodology is typically not implemented in a drive system where a gear is inserted between the motor and the load, since such system lacks stiffness and, more particularly, the gears exhibit backlash or play. Such control methodology is typically employed in drive systems where the motor, for example a torque motor, is coupled directly to the machine shaft. However, a favorable control response can only be attained at the expense of a relatively complex and expensive drive system.

A methodology of the aforedescribed type is depicted, for example, in the NC/CNC Handbook 95/96, by Hans B. Kief, published by Carl Hanser Verlag Munich Vienna, 1995, page 189, FIG. 1a, which describes the use of a combination of two measurement signals in a control circuit.

It would therefore be desirable and advantageous to provide an improved method for enhancing the control response of a drive train, which obviates prior art shortcomings and is able to specifically control drive trains having inherent backlash and/or elasticity, in particular of machine tools, production machines, and robots.

SUMMARY OF THE INVENTION

According to one aspect of the invention, a method for enhancing the control response of at least one drive train of a machine tool or production machine, wherein the at least one drive train includes a motor and a load coupled to the motor with backlash and/or elasticity, includes the steps of measuring a motor speed on the motor, measuring a load speed proximate to the load, computing a combined signal comprising a weighted measured motor speed and a weighted measured load speed, and controlling the motor speed with the combined signal.

According to another aspect of the invention, a method for enhancing the control response of at least one drive train of a machine tool or production machine, wherein the at least one drive train includes a motor and a load coupled to the motor with backlash and/or elasticity, includes the steps of measuring a motor speed on the motor, measuring a load speed proximate to the load, computing a weighted difference between the measured motor speed and the measured load speed, adding the measured load speed to the weighted difference to form a combined signal, and controlling the motor speed with the combined signal.

Advantageous embodiments of the invention may include one or more of the following features. The weighted measured motor speed can be computed by multiplying the measured motor speed by a parameter ($\alpha$) and weighted measured load speed is computed by multiplying the measured load speed by a parameter ($1-\alpha$). Alternatively, the weighted difference can be computed by multiplying an actual difference between the measured motor speed and the measured load speed measured motor speed by a parameter ($\alpha$). The parameter a can have a value between zero and one.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
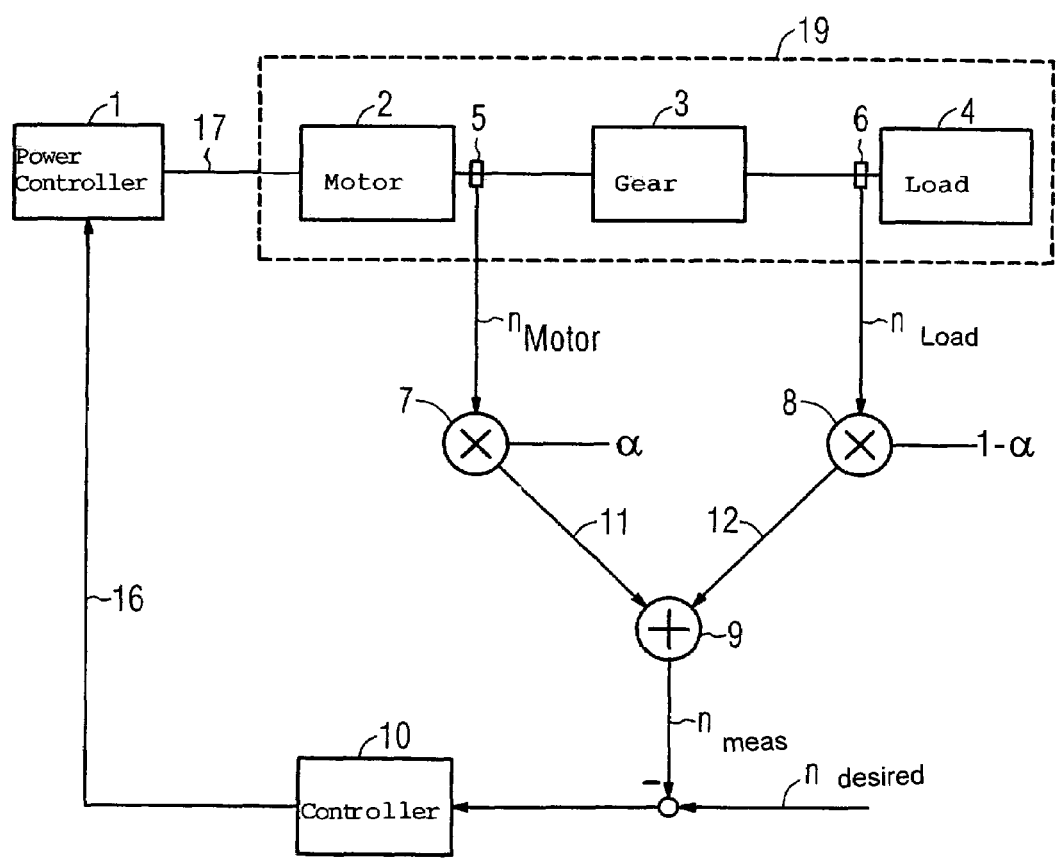
FIG. 1 is a first embodiment of the method for enhancing the control response of a drive train according to the invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

According to the method of the invention, the variable to be controlled is formed by a combination of the motor speed $n_{motor}$ measured on the motor and the load speed $n_{load}$ measured proximate to the load of the drive train. This approach increases the first mechanical resonance frequency of the controlled system which determines attainable control response. The motor speed $n_{motor}$ can be, for example, a motor rotation speed (RPM) or, for linear motors, a travel speed of the motor. The load speed $n_{load}$ can be, for example, a rotation speed of the load or a travel speed of the load, for example, along an axis of a machine.

Turning now to the drawing, FIG. 1 shows a block circuit diagram of a first embodiment of the method of the invention, with a motor 2 being mechanically coupled with a load 4 through a gear 3. The motor 2, the gear 3 and the load 4 form a drive train 19 which is indicated in FIG. 1 by a dotted line. A rotation speed sensor 5 located proximate to the motor 2 transmits the measured motor speed $n_{motor}$ to a multiplier 7. A rotation speed sensor 6 located proximate to the load 4 transmits the measured load rotation speed $n_{load}$ to a multiplier 8. The measured motor speed $n_{motor}$ is multiplied in multiplier 7 by a parameter α to compute a weighted motor rotation speed 11 which is transmitted to an adder 9. The measured load speed $n_{load}$ is multiplied in multiplier 8 with a factor (1−α) to compute a weighted load speed 12 which is also transmitted to the adder 9. The weighted motor speed 11 and the weighted load speed 12 are added in adder 9, thereby producing a combined signal $n_{meas}$ which represents the quantity to be controlled. The difference between the combined signal $n_{meas}$ and a desired speed value $n_{desired}$ is transmitted as an input variable to a controller 10, which can be, for example, a proportional-integral (PI) controller. The controller 10 at generates at the controller output a control signal 16 which is supplied to a power controller 1. The power controller 1 controls and/or powers the motor 2 via an electrical connection 17.

In FIG. 1, the combined signal $n_{meas}$ is calculated using the following equation $$n_{meas} = \alpha * n_{motor} + (1-\alpha) * n_{load} \tag{1}$$

As seen from the above equation, for the limit α=0, the control structure depicted in FIG. 1 is dominated entirely by the load characteristic, whereas for the limit α=1, the control structure is dominated entirely by the motor characteristic.

The transfer function from the motor torque $M_M$ and load torque $M_L$ to the combined signal $n_{meas}$ can be derived from the equation $$n_{meas} = \frac{\left(1 + s\frac{D}{c} + s^2 \frac{\alpha J_L}{c}\right)M_M + \left(1 + s\frac{D}{c} + s^2 \frac{\alpha J_M}{c}\right)M_L}{s(J_L + J_M)\left(1 + s\frac{D}{c} + s^2 \frac{J_L J_M}{c(J_L + J_M)}\right)} \tag{2}$$

wherein
D: mechanical damping of the drive train
c: elastic modulus of the drive train
$J_M$: motor inertia
$J_L$: load inertia
s: complex angular frequency (S=iω=i*2*π*rotation frequency)

By setting the numerator of the equation (2) to zero, the frequency $f_T$ at which the motor torque in the transfer function from motor torque $M_M$ to the combined signal $n_{meas}$ is zero ($M_L$=0), can be calculated as $$f_T = \frac{1}{2\pi\sqrt{\alpha}} * \sqrt{\frac{c}{J_L}}. \tag{3}$$

As seen from equations (2) and (3), by combining the motor speed $n_{motor}$ with the load speed $n_{load}$ in the form of a commonly controlled variable, the frequency $f_T$ at which the load torque is equal to zero increases by a factor $1/\sqrt{\alpha}$ in comparison to a control system that uses as the controlled variable only the motor rotation speed (α=1). As mentioned above, the parameter a has a value between 0 and 1. This also increases the mechanical bandwidth of the mechanical transmission from the motor speed $n_{motor}$ to the combined signal $n_{meas}$ The control amplification can then also be increased by the factor $1/\sqrt{\alpha}$ with optimized damping of the control amplification of controller 10. This enhances by the factor $1/\sqrt{\alpha}$ the control response and suppresses perturbations.

The equation (1) can be transformed mathematically into the form $$n_{meas} = n_{load} + \alpha*(n_{motor} - n_{load}) \tag{4}$$

Figure 2:
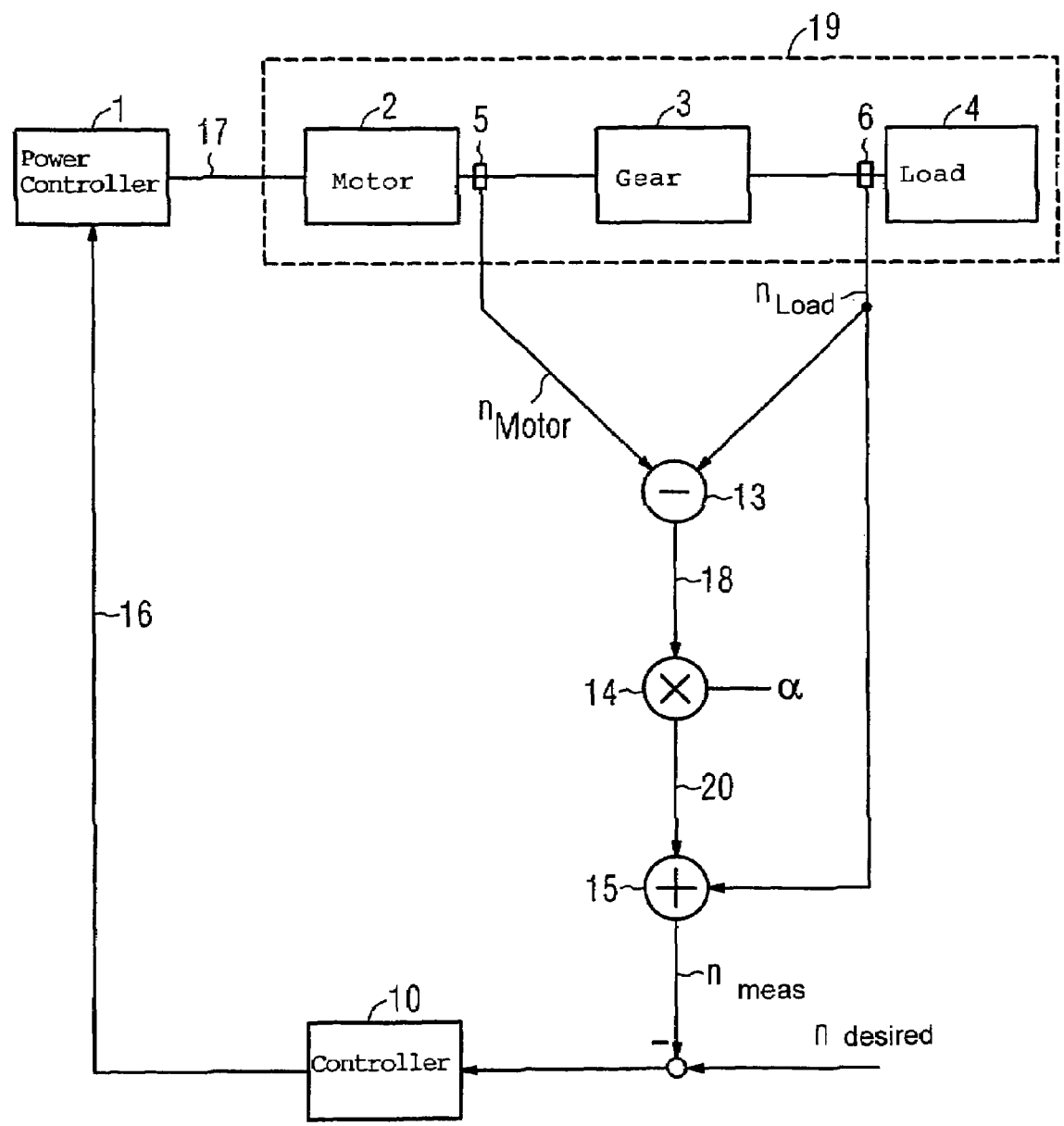
FIG. 2 is a second embodiment of the method for enhancing the control response of a drive train according to the invention.

FIG. 2 shows a schematic block circuit diagram of a second embodiment of the method of the invention, where the measured motor speed $n_{motor}$ is combined with the measured load speed $n_{load}$ to form the combined signal $n_{meas}$ in a different way. In all other aspects, FIG. 2 is identical to FIG. 1. In FIG. 2, the combined signal $n_{meas}$ is computed using equation (4). The measured load speed $n_{load}$ is first subtracted from the measured motor speed $n_{motor}$ in a subtracter 13. The computed difference 18 is weighted by multiplying the computed difference with a in a multiplier 14. The parameter a has again a value between 0 and 1. The resulting weighted difference 20 is then added in adder 15 to the measured load speed $n_{load}$.

The combined signal $n_{meas}$ of FIG. 2 is identical to the combined signal $n_{meas}$ of FIG. 1.

The effect resulting from the combination of the controlled variable $n_{meas}$ is illustrated once more with reference to the equation (4). The effect of backlash and/or elasticity of the gear 3 and the drive train 19, respectively, is expressed in the equation (4) in the form of a difference between motor speed $n_{motor}$ and load speed $n_{load}$ that is weighted by the parameter $\alpha$. This term is combined with, i.e. added to, the actual target variable, namely the load speed $n_{load}$. The response of the control circuit to backlash and/or elasticity can be adjusted by a suitable selection of the parameter $\alpha$.

It will be understood that the control elements, which in FIGS. 1 and 2 are depicted as discrete functional blocks, such as controller 10, multipliers 7, 8, 14, subtracter 13, and adders 9, 15, can also be implemented as integral components of a control system, for example, a microprocessor-based system.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for enhancing the control response of at least one drive train of a machine tool or production machine, wherein the at least one drive train includes a motor and a load coupled to the motor with backlash and/or elasticity, comprising the steps of:

measuring a motor speed on the motor;

weighting the measured motor speed by multiplication with a parameter ($\alpha$), wherein $\alpha$ has a value between zero and one;

measuring a load speed proximate to the load;

weighting the measured load speed by multiplication with a parameter (1-$\alpha$);

computing a combined signal comprising a weighted measured motor speed and a weighted measured load speed; and controlling the motor speed with the combined signal.

2. The method of claim 1, wherein controlling the motor speed includes regulating a difference between the combined signal and a desired speed value to zero.

3. The method of claim 1, wherein controlling the motor speed with the combined signal increases a torque cancellation frequency by a factor $1/\sqrt{\alpha}$ over a control operating solely based on the motor rotation speed.

4. A method for enhancing the control response of at least one drive train of a machine tool or production machine, wherein the at least one drive train includes a motor and a load coupled to the motor with backlash and/or elasticity, comprising the steps of:

measuring a motor speed on the motor;

measuring a load speed proximate to the load;

computing a weighted difference between the measured motor speed and the measured load speed by multiplying an actual difference between the measured motor speed and the measured load speed measured motor speed by a parameter ($\alpha$), wherein the parameter a has a value between zero and one:

adding the measured load speed to the weighted difference to form a combined signal; and controlling the motor speed with the combined signal.

5. The method of claim 4, wherein controlling the motor speed includes regulating a difference between the combined signal and a desired speed value to zero.

6. The method of claim 4, wherein controlling the motor speed with the combined signal increases a torque cancellation frequency by a factor $1/\sqrt{\alpha}$ over a control operating solely based on the motor rotation speed.

* * * * *

UNITED STATES PATENT AND TRADEMARK OFFICE
CERTIFICATE OF CORRECTION

PATENT NO. : 7,005,826 B2
DATED : February 28, 2006
INVENTOR(S) : Bernhard Dirsch and Hans-Peter Tröndle It is certified that error appears in the above-identified patent and that said Letters Patent is hereby corrected as shown below:

<u>Column 6,</u>
Line 28, after "parameter" (second occurrence) replace "a" with -- α --.

Signed and Sealed this

Twenty-third Day of May, 2006

JON W. DUDAS
*Director of the United States Patent and Trademark Office*